United States Patent
Zhang et al.

(10) Patent No.: US 11,916,382 B2
(45) Date of Patent: Feb. 27, 2024

(54) OPTIMIZED OPERATION PLAN FOR A POWER SYSTEM

(71) Applicant: Caterpillar Inc., Peoria, IL (US)

(72) Inventors: Yanchai Zhang, Dunlap, IL (US); Syed Ameenuddin Hussain, Dunlap, IL (US); Baoyang Deng, Edwards, IL (US); Zhijun Cai, Dunlap, IL (US); Shiferaw D. Beyene, Peoria, IL (US); Casey Alan Otten, Spring, TX (US); Perry Converse, Lafayette, IN (US); Theodore E. Wiersema, Peoria, IL (US); Michael A. Snopko, Washington, IL (US)

(73) Assignee: Caterpillar Inc., Peoria, IL (US)

( * ) Notice: Subject to any disclaimer, the term of this patent is extended or adjusted under 35 U.S.C. 154(b) by 29 days.

(21) Appl. No.: 17/455,865

(22) Filed: Nov. 19, 2021

(65) Prior Publication Data
US 2023/0163593 A1     May 25, 2023

(51) Int. Cl.
*H02J 3/00* (2006.01)
*G05B 15/02* (2006.01)
*G06Q 10/04* (2023.01)

(52) U.S. Cl.
CPC .............. *H02J 3/003* (2020.01); *G05B 15/02* (2013.01); *G06Q 10/04* (2013.01)

(58) Field of Classification Search
CPC .......... H02J 3/003; G05B 15/02; G06Q 10/04
USPC ........................................................ 700/286
See application file for complete search history.

(56) References Cited

U.S. PATENT DOCUMENTS

| | | | |
|---|---|---|---|
| 9,268,326 B2 | 2/2016 | Treiber et al. | |
| 9,564,757 B2 | 2/2017 | Wang et al. | |
| 10,408,029 B2 | 9/2019 | Rodrigues et al. | |
| 10,417,561 B2 | 9/2019 | Mohaghegh | |
| 10,927,774 B2 | 2/2021 | Cai et al. | |
| 2015/0075167 A1 | 3/2015 | Caouette | |
| 2020/0327264 A1* | 10/2020 | Wang | G06F 30/18 |

FOREIGN PATENT DOCUMENTS

| | | |
|---|---|---|
| CN | 107633330 A | 1/2018 |
| CN | 110780605 A | 2/2020 |

* cited by examiner

*Primary Examiner* — Mohammad Ali
*Assistant Examiner* — Saad M Kabir

(57) ABSTRACT

A system may determine configuration information associated with a power system for a work site that includes one or more power sources. The system may determine respective operation parameters of the one or more power sources and one or more performance criteria associated with the power system. The system may determine a baseline operation plan for the power system. The system may identify an optimization analysis technique and may process, using the optimization analysis technique, the configuration information associated with the power system, the respective operation parameters of the one or more power sources, and the one or more performance criteria associated with the power system to generate the optimized operation plan for the power system. The system may cause, based on the baseline operation plan for the power system and the optimized operation plan for the power system, one or more actions to be performed.

20 Claims, 10 Drawing Sheets

OPTIMIZED OPERATION PLAN FOR A POWER SYSTEM

TECHNICAL FIELD

The present disclosure relates generally to generating an operation plan for a power system and, for example, to generating an optimized operation plan for a power system.

BACKGROUND

A power system generates power (e.g., mechanical power and/or electrical power) for a work site. A power system often includes multiple power sources of a same or a different type (e.g., one or more internal combustion engines, one or more generation sets, one or more energy storage systems, and/or one or more hydraulic fracturing rigs). However, a power system is often manually configured, which causes the power system to operate in a nonoptimal manner, such as in a manner that consumes nonoptimal amounts of fuel or that produces nonoptimal amounts of emissions.

U.S. Pat. No. 9,564,757 (the '757 patent) discloses methods for optimizing hybrid power systems. Per the '757 patent, an apparatus optimizes a hybrid power system with respect to long-term characteristics of the hybrid power system. The apparatus comprises: a real-time controller of the hybrid power system; and a processor cooperating with the real-time controller, the processor being structured to input current measurements of information from the hybrid power system and hybrid dynamics information including continuous dynamics and discrete time dynamics that model the hybrid power system, provide online optimization of the hybrid power system based upon the input, and output a power flow reference and a number of switch controls to the real-time controller based upon the online optimization.

While the '757 patent discloses using a processor and a real-time controller to optimize a hybrid power system, the present disclosure is associated with an analysis system generating an optimized operation plan for any type of power system. Further the present disclosure allows for an operator of the power system to interact with an interactive user interface provided by the analysis system to facilitate generation of the optimized operation plan. The analysis system of the present disclosure solves one or more of the problems set forth above and/or other problems in the art.

SUMMARY

Some implementations described herein relate to a system. The system may include one or more memories and one or more processors coupled to the one or more memories. The system may be configured to determine configuration information associated with a power system for a work site that includes one or more power sources. The system may be configured to determine respective operation parameters of the one or more power sources. The system may be configured to determine one or more performance criteria associated with the power system. The system may be configured to identify an optimization analysis technique for generating an optimized operation plan for the power system. The system may be configured to process, using the optimization analysis technique, the configuration information associated with the power system, the respective operation parameters of the one or more power sources, and the one or more performance criteria associated with the power system to generate the optimized operation plan for the power system. The system may be configured to cause, based on the optimized operation plan for the power system, one or more actions to be performed.

Some implementations described herein relate to a method. The method may include determining, by a system, configuration information associated with a power system for a work site that includes one or more power sources. The method may include determining, by the system, respective operation parameters of the one or more power sources. The method may include determining, by the system, one or more performance criteria associated with the power system. The method may include determining, by the system, a baseline operation plan for the power system. The method may include identifying, by the system, an optimization analysis technique for generating an optimized operation plan for the power system. The method may include processing, by the system and using the optimization analysis technique, the configuration information associated with the power system, the respective operation parameters of the one or more power sources, and the one or more performance criteria associated with the power system to generate the optimized operation plan for the power system. The method may include causing, by the system and based on the baseline operation plan for the power system and the optimized operation plan for the power system, one or more actions to be performed.

Some implementations described herein relate to a non-transitory computer-readable medium that stores a set of instructions for a device. The set of instructions, when executed by one or more processors of the device, may cause the device to determine configuration information associated with a power system for a work site that includes one or more power sources. The set of instructions, when executed by one or more processors of the device, may cause the device to determine respective operation parameters of the one or more power sources. The set of instructions, when executed by one or more processors of the device, may cause the device to determine one or more performance criteria associated with the power system. The set of instructions, when executed by one or more processors of the device, may cause the device to identify an optimization analysis technique for generating an optimized operation plan for the power system. The set of instructions, when executed by one or more processors of the device, may cause the device to process, using the optimization analysis technique, the configuration information associated with the power system, the respective operation parameters of the one or more power sources, and the one or more performance criteria associated with the power system to generate the optimized operation plan for the power system. The set of instructions, when executed by one or more processors of the device, may cause the device to cause, based on the optimized operation plan for the power system, one or more actions to be performed.

DETAILED DESCRIPTION

Figure 1:
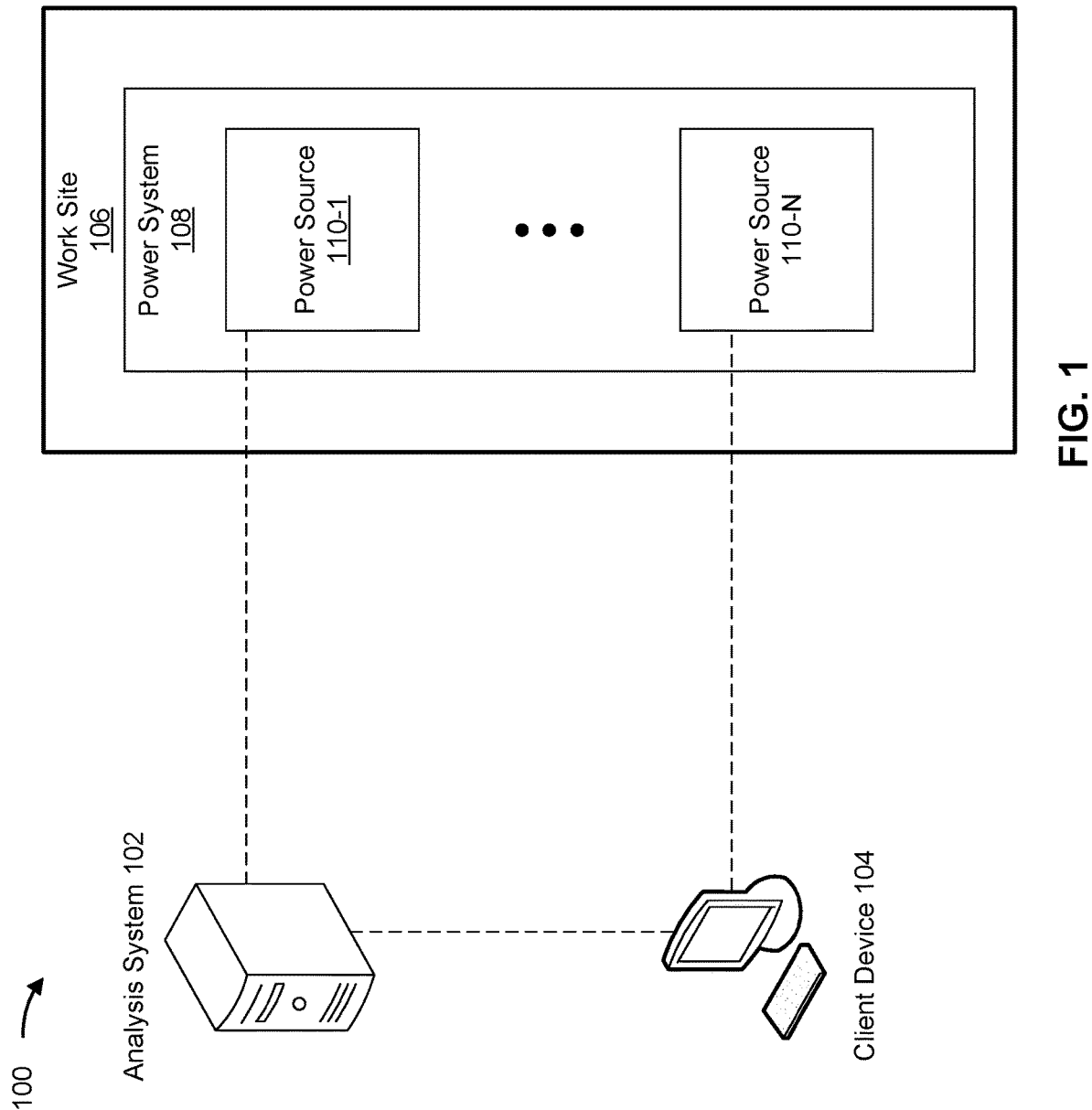
FIG. 1 is a diagram of an example implementation associated with a power system described herein.

FIG. 1 is a diagram of an example implementation 100 associated with a power system. As shown in FIG. 1, example implementation 100 includes an analysis system 102 and a client device 104, which are described in more detail below in connection with FIG. 3. As further shown in FIG. 1, example implementation 100 includes a work site 106 and a power system 108 that includes one or more power sources 110 (shown as power sources 110-1 through n, where N≥1).

The power system 108 may be configured to utilize the one or more power sources 110 to generate power (e.g., mechanical power and/or electrical power) for the work site 106. A power source 110 may include, for example, a generation set (a "genset"), an internal combustion engine (e.g., a diesel engine, a gas engine, or a dynamic gas blending (DGB) engine), an energy storage system (e.g., a battery), or a hydraulic fracturing rig. The work site 106 may be a physical location at which the power system 108 is located. For example, the work site 106 may be a construction site, a commercial building site, a marine vessel site, or a hydraulic fracturing site.

As further shown in FIG. 1, the analysis system 102 and the client device 104 may be connected to each other, the power system 108, and/or at least one power source 110 of the one or more power sources 110. For example, the analysis system 102, the client device 104, the power system 108, and/or the at least one power source 110 may be connected to each other via a network (e.g., the network 310 described herein in relation to FIG. 3).

As indicated above, FIG. 1 is provided as an example. Other examples may differ from what is described with regard to FIG. 1.

FIGS. 2A-2G are diagrams of an example implementation 200 associated with generating an optimized operation plan for a power system, which is applicable to any power system.

Figure 2A:
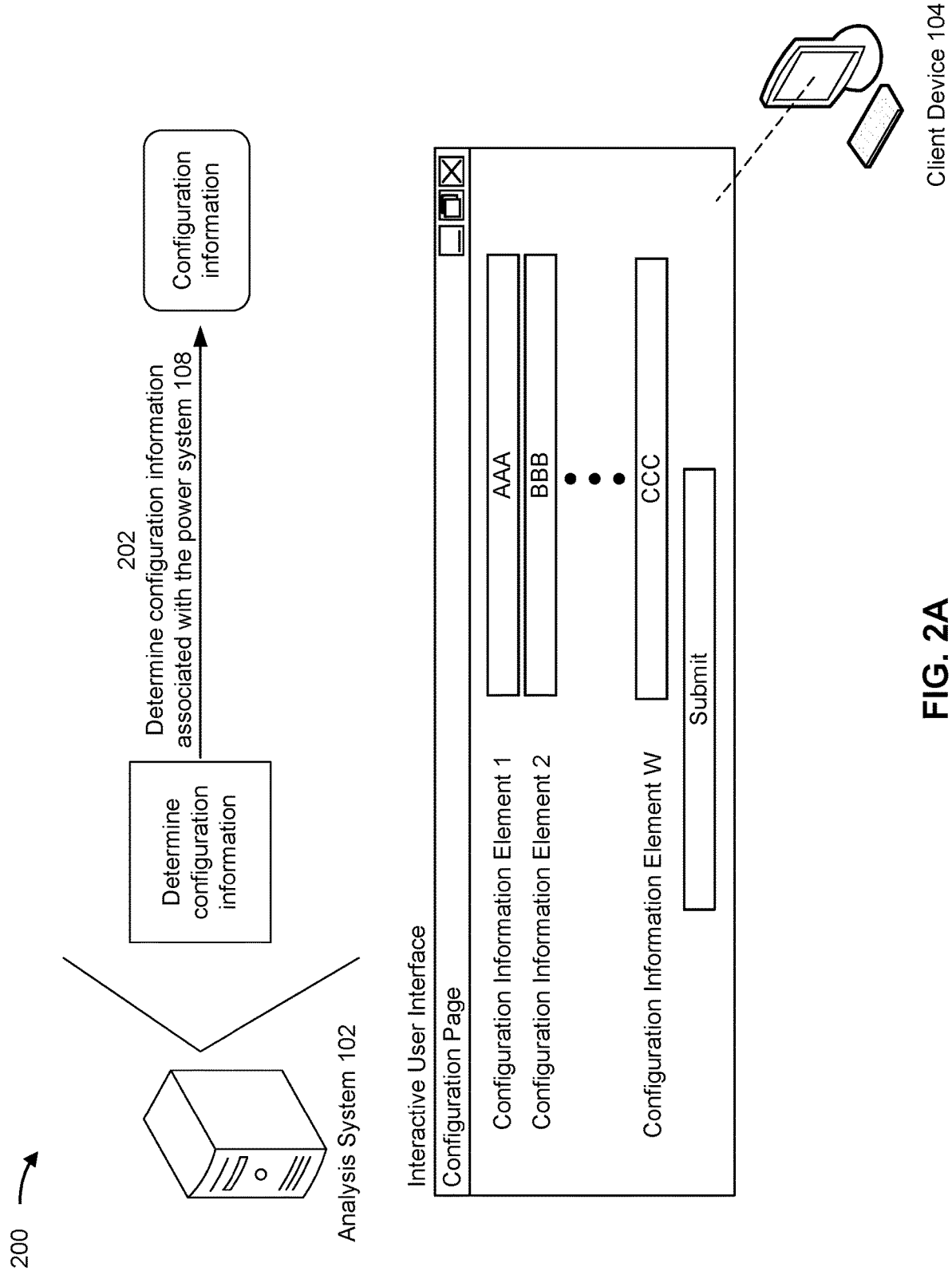
FIGS. 2A-2G are diagrams of an example implementation associated with generating an optimized operation plan for a power system described herein.

As shown in FIG. 2A, and by reference number 202, the analysis system 102 may determine configuration information associated with the power system 108. The configuration information associated with the power system 108 may include one or more configuration elements, such as an identifier associated with the work site 106 (e.g., a name of the work site 106 or a unique identifier (UID) associated with the work site 106), a type of the work site 106 (e.g., a construction site, a commercial building site, a marine vessel site, or a hydraulic fracturing site), an identifier of the power system (e.g., a name of the power system 108 or a UID associated with the power system 108), a type of the power system 108 (e.g., an engine type power system, an energy storage type power system, a generator type power system, a hybrid type power system, or a hydraulic fracturing type power system), a number of the one or more power sources 110 included in the power system 108, an identifier of each of the one or more power sources 110 included in the power system 108 (e.g., a name of each power source 110 or a UID associated with each power source 110), a type of each of the one or more power sources 110 included in the power system 108 (e.g., an indication of whether each of the one or more power sources 110 is a genset, an internal combustion engine, an energy storage system, or a hydraulic fracturing rig), a priority of each of the one or more power sources 110 included in the power system 108 (e.g., an indication of importance of utilization of each of the one or more power sources 110), and/or a group associated with each of the one or more power sources 110 included in the power system 108 (e.g., an indication of which power sources 110 of the one or more power sources 110 are to be utilized together).

As further shown in FIG. 2A, the analysis system 102 may provide an interactive user interface for display. For example, the analysis system 102 may provide the interactive user interface to the client device 104 to cause the interactive user interface to be displayed on a display of the client device 104. The interactive user interface may include an input functionality that allows a user (e.g., of the client device 104) to input information. For example, as further shown in FIG. 2A, the interactive user interface may include a "configuration page" that allows a user to enter one or more configuration elements associated with the power system 108 (shown as configuration information elements 1 through W, where W≥1). In this way, the analysis system 102 may receive input information and may determine the configuration information associated with the power system 108 based on the input information (e.g., by reading or parsing the input information). Additionally, or alternatively, the analysis system 102 may communicate with a data structure associated with the power system 108 (e.g., a database, a table, or an electronic file that is included in the power system 108 and/or accessible to the power system 108) to obtain operation information associated with the power system 108 (e.g., that includes one or more configuration elements associated with the power system 108). The analysis system 102 may determine the configuration information associated with the power system 108 based on the operation information (e.g., by reading or parsing the operation information).

Figure 2B:
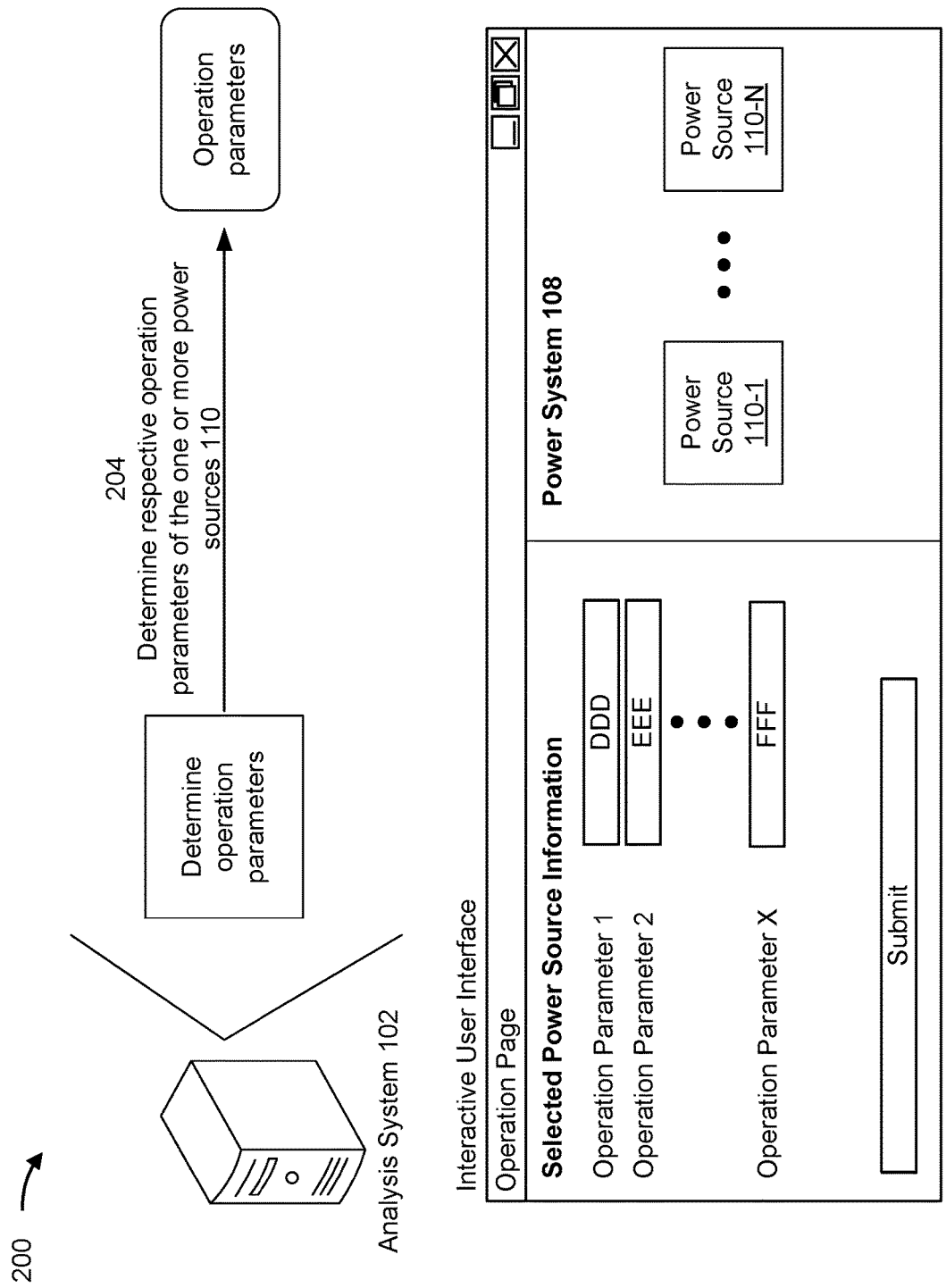

As shown in FIG. 2B, and by reference number 204, the analysis system 102 may determine respective operation parameters of the one or more power sources 110. The respective operation parameters of the one or more power sources 110 may indicate, for each power source 110, of the one or more power sources 110, one or more operation parameters, such as an identifier associated with the power source 110 (e.g., a name of the power source 110 or a UID associated with the power source 110), a type of the power source 110 (e.g., an indication that the power source 110 is a genset, an internal combustion engine, an energy storage system, or a hydraulic fracturing rig), a vendor of the power source 110 (e.g., a "make" of the power source 110), a model of the power source 110, one or more capabilities of the power source 110 (e.g., an engine speed range, a transmission gear range, a pump flow rate range, a power output range, a fuel consumption rate range, a battery charge rate range, a battery discharge rate range, and/or a battery capacity range, among other examples), one or more settings of the power source (e.g., a baseline engine speed, a baseline transmission gear, a baseline pump flow rate, a baseline power output, a baseline fuel consumption rate, a baseline battery charge rate, a baseline battery discharge rate, and/or a baseline battery capacity, among other examples), and/or an activation status of the power source 110 (e.g., an indication of whether the power source 110 is turned on and/or is active).

As further shown in FIG. 2B, the analysis system 102 may provide the interactive user interface for display (e.g., as described elsewhere herein). The interactive user interface may include an input functionality that allows a user (e.g., of the client device 104) to input information related to the respective operation parameters of the one or more power sources 110. For example, as further shown in FIG. 2B, the interactive user interface may include an "operation page" that allows a user to enter one or more operation parameters (shown as operation parameters 1 through X, where X≥1) of each power source 110 of the one or more power sources 110. In this way, the analysis system 102 may receive input information and may determine the respective operation parameters of the one or more power sources 110 based on the input information (e.g., by reading or parsing the input information). Additionally, or alternatively, the analysis system 102 may communicate with a data structure associated with the power system 108 and/or the one or more power sources 110 (e.g., a database, a table, or an electronic file that is included in the power system 108 or at least one power source 110 and/or accessible to the power system 108 or the one or more power sources 110) to obtain operation information associated with the one or more power sources 110 (e.g., that includes one or more operation parameters of each of the one or more power sources 110). The analysis system 102 may determine the respective operation parameters of the one or more power sources 110 based on the operation information (e.g., by reading or parsing the operation information).

Figure 2C:
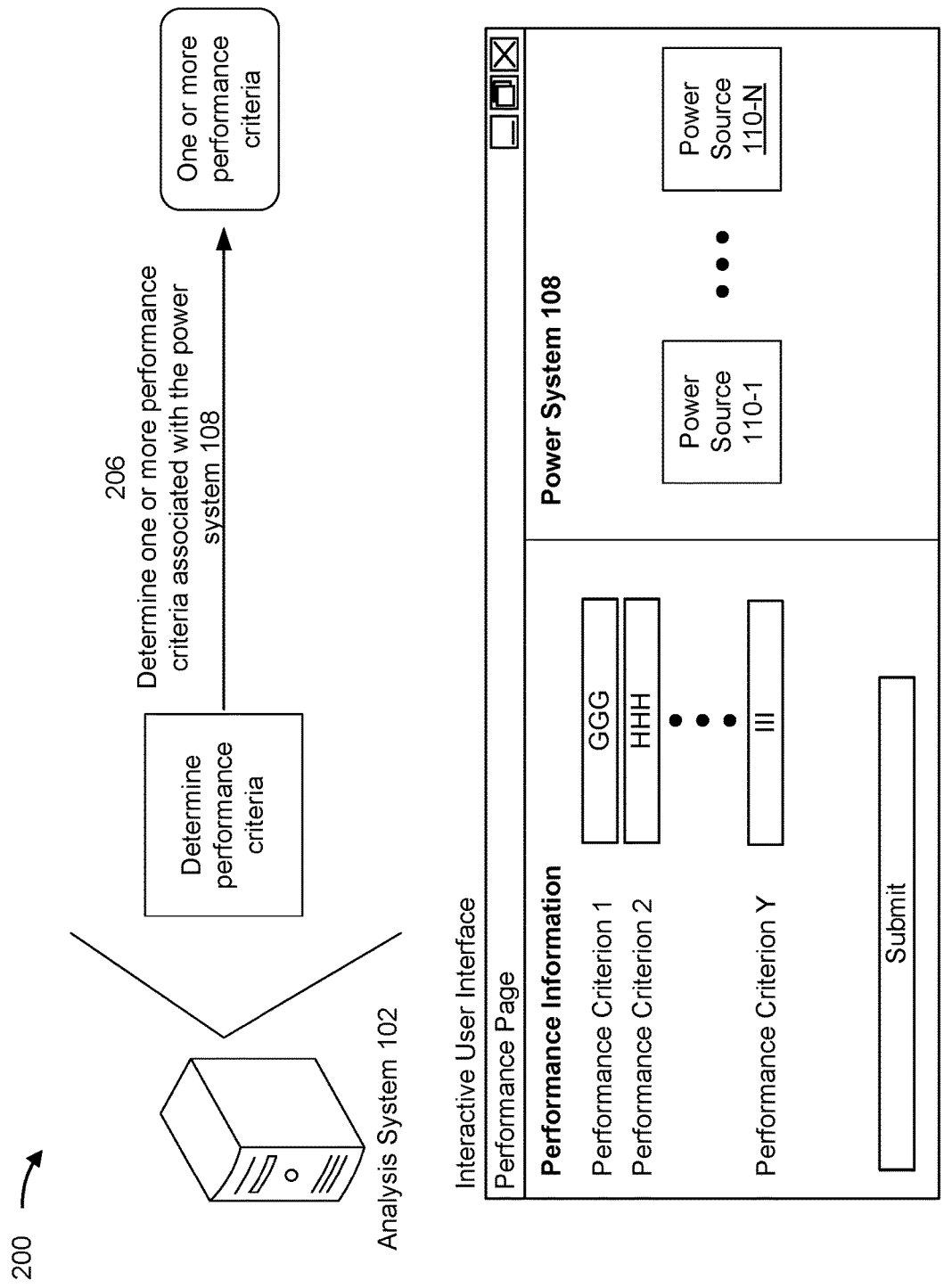

As shown in FIG. 2C, and by reference number 206, the analysis system 102 may determine one or more performance criteria associated with the power system 108. The one or more performance criteria associated with the power system 108 may include, for example, a net power output of the power system 108, a net discharge pressure of the power system 108, a net pump flow rate of the power system 108, and/or a net battery discharge rate, among other examples.

As further shown in FIG. 2C, the analysis system 102 may provide the interactive user interface for display (e.g., as described elsewhere herein). The interactive user interface may include an input functionality that allows a user (e.g., of the client device 104) to input information related to the one or more performance criteria associated with the power system 108. For example, as further shown in FIG. 2C, the interactive user interface may include a "performance page" that allows a user to enter one or more performance criteria associated with the power system 108 (shown as performance criteria 1 through Y, where Y≥1). In this way, the analysis system 102 may receive input information and may determine the one or more performance criteria associated with the power system 108 based on the input information (e.g., by reading or parsing the input information). Additionally, or alternatively, the analysis system 102 may communicate with the data structure associated with the power system 108 to obtain operation information associated with the power system 108 (e.g., that includes one or more performance criteria associated with the power system 108). The analysis system 102 may determine the one or more performance criteria associated with the power system 108 based on the operation information (e.g., by reading or parsing the operation information).

Figure 2D:
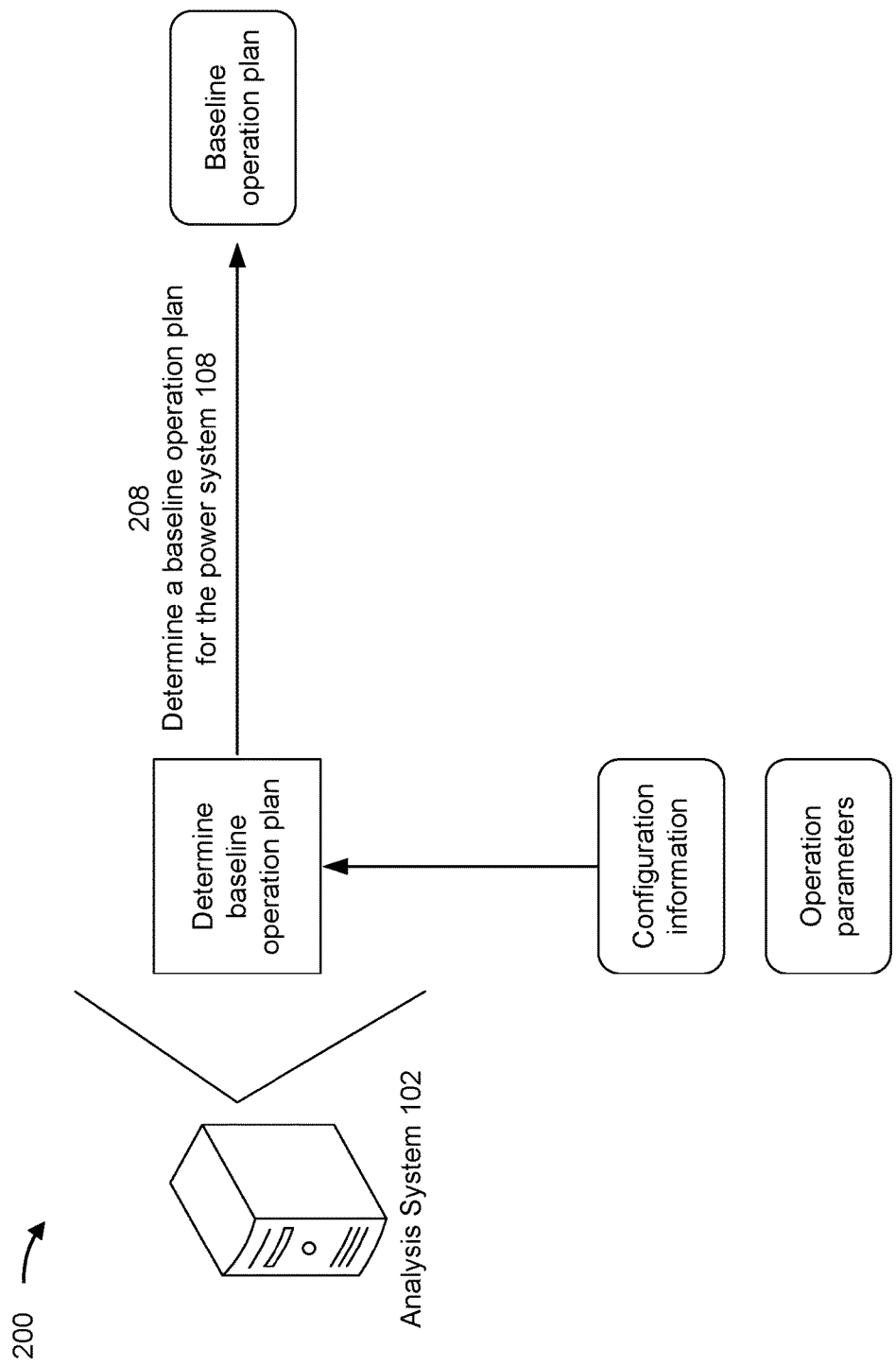

As shown in FIG. 2D, and by reference number 208, the analysis system 102 may determine a baseline operation plan for the power system 108. The analysis system 102 may process the configuration information associated with the power system 108 and/or the respective operation parameters of the one or more power sources 110 to generate the baseline operation plan for the power system. For example, the analysis system 102 may process the configuration information to identify the one or more power sources 110 and may process the respective operation parameters of the one or more power sources 110 to determine one or more baseline settings of each of the one or more power sources 110 (e.g., settings input by the user of the client device 104 via the interactive user interface). Accordingly, the analysis system 102 may generate the baseline operation plan for the power system 108 to identify the one or more baseline settings of each of the one or more power sources 110.

Figure 2E:
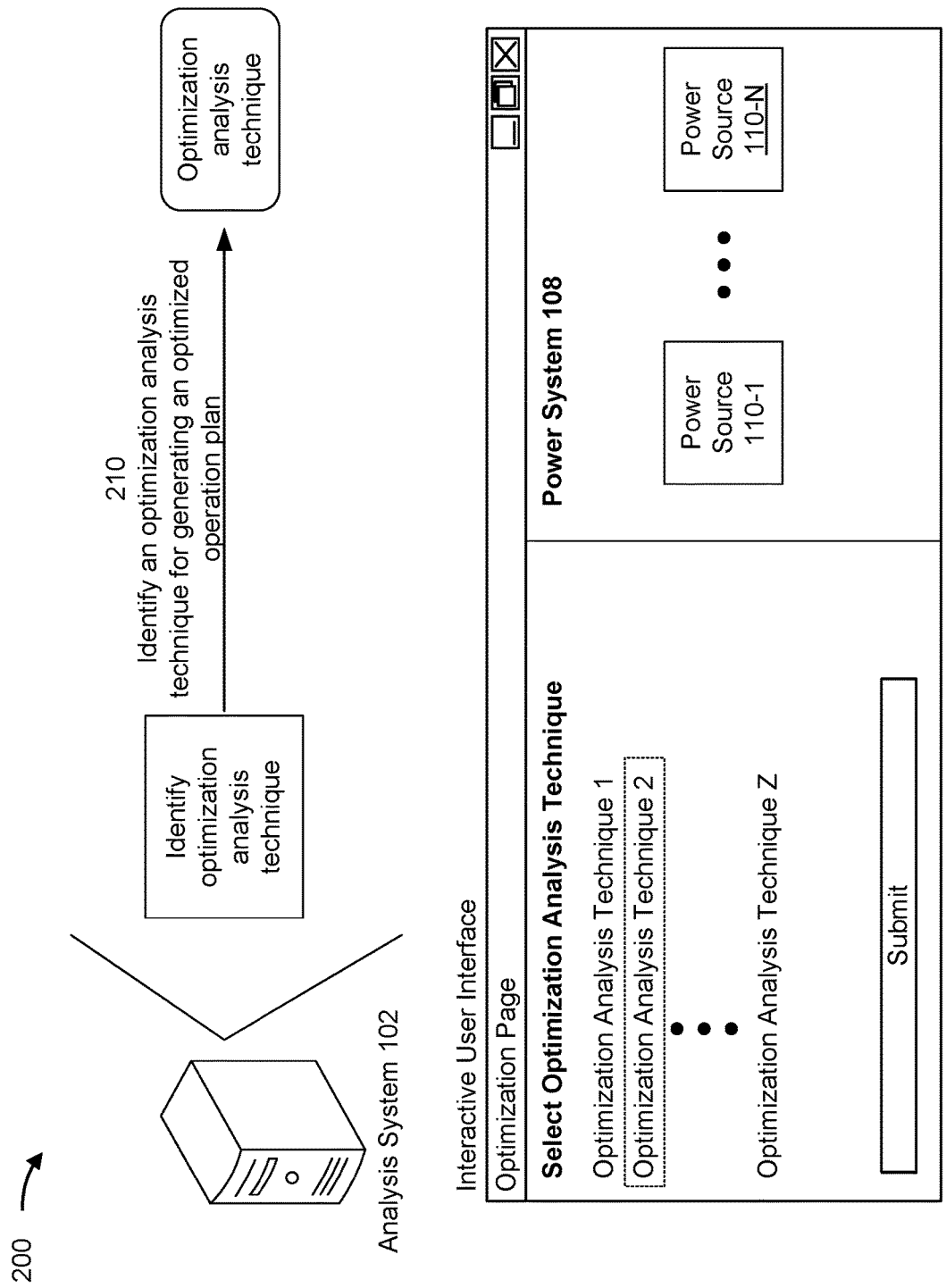

As shown in FIG. 2E, and by reference number 210, the analysis system 102 may identify an optimization analysis technique for generating an optimized operation plan for the power system 108. The optimization analysis technique may include, for example, a power system fuel economy optimization analysis technique (e.g., an optimization analysis technique for generating an optimized operation plan that minimizes fuel consumption of the power system 108), a power system maintenance optimization analysis technique (e.g., an optimization analysis technique for generating an optimized operation plan that minimizes maintenance costs and/or maintenance time of the power system 108), a power system performance optimization analysis technique (e.g., an optimization analysis technique for generating an optimized operation plan that provides a maximum power output performance of the power system 108), or a power system emissions optimization analysis technique (e.g., an optimization analysis technique for generating an optimized operation plan that minimizes emissions by the power system 108). The optimization analysis technique may utilize an optimization map that was generated using at least one particle swarm optimization algorithm. For example, when the optimization analysis technique includes a power system fuel economy optimization analysis technique, the optimization analysis technique may utilize an optimization map that was generated using at least one particle swarm optimization algorithm that is configured to reduce fuel consumption of the power system 108.

As further shown in FIG. 2E, the analysis system 102 may provide the interactive user interface for display (e.g., as described elsewhere herein). The interactive user interface may include a list of a plurality of optimization analysis techniques. A user (e.g., of the client device 104) may select an optimization analysis technique from the list. For example, as further shown in FIG. 2D, the interactive user interface may include an "optimization page" that displays a list of a plurality of optimization analysis techniques (shown as optimization analysis techniques 1 through Z, where Z>1) and allows a user to enter a selection of a particular optimization analysis technique of the plurality of optimization analysis techniques. In this way, the analysis system 102 may receive the selection and may identify an optimization analysis technique for generating an optimized operation plan for the power system 108 (e.g., by reading or parsing the selection). In some implementations, the interactive user interface may allow a user to select multiple optimization analysis techniques of the plurality of optimization analysis techniques. For example, the user may enter a selection of the multiple optimization analysis techniques and respective weight factors associated with each of the multiple optimization analysis techniques (e.g., a 0.7 weight factor for a first optimization analysis technique and a 0.3 weight factor for a second optimization analysis technique to indicate that the first optimization analysis technique should be given 70% weight and the second optimization analysis technique should be given 30% weight for generating the optimized operation plan for the power system 108). In this way, the analysis system 102 may receive the selection and may identify the multiple optimization analysis techniques for generating the optimized operation plan for the power system 108 (e.g., by reading or parsing the selection).

Figure 2F:
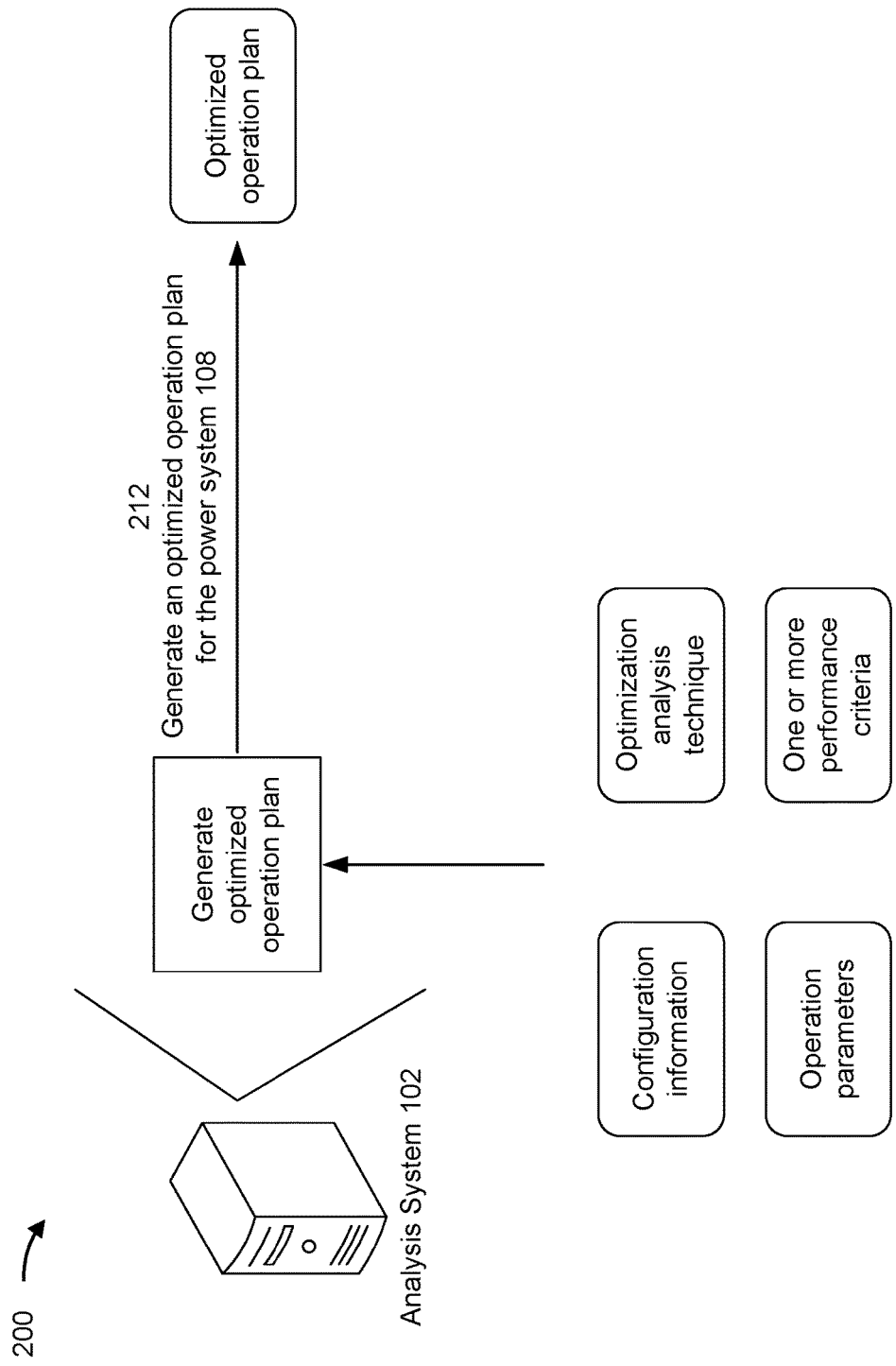

As shown in FIG. 2F, and by reference number 212, the analysis system 102 may generate the optimized operation plan for the power system 108. For example, the analysis system 102 may process, using the optimization analysis technique or the multiple optimization analysis techniques (e.g., that were identified the analysis system 102, as described herein in relation to FIG. 2E and reference number 210), the configuration information associated with the power system 108, the respective operation parameters of the one or more power sources 110, and/or the one or more performance criteria associated with the power system 108 to generate the optimized operation plan for the power system 108. When using the multiple optimization analysis techniques, the analysis system 102 may process the configuration information associated with the power system 108, the respective operation parameters of the one or more power sources 110, and/or the one or more performance criteria associated with the power system 108 based on the respective weight factors associated with the multiple optimization analysis techniques to generate the optimized operation plan for the power system 108. The optimized operation plan may identify, for a particular power source 110, of the one or more power sources 110, one or more suggested settings of the particular power source 110 and/or a suggested activation status of the particular power source 110.

In some implementations, the analysis system 102 may be configured to generate the optimized operation plan for facilitating design of a not-yet-implemented power system 108 for the work site 106. Accordingly, the analysis system 102 may be configured to generate an optimized operation plan that identifies an additional power source 110, such as an energy storage system, to include in the power system 108. The optimized operation plan may identify, for example, a type of the additional power source 110, a vendor of the additional power source 110, a model of the additional power source 110, one or more capabilities of the additional power source 110, or one or more settings of the additional power source 110.

Figure 2G:
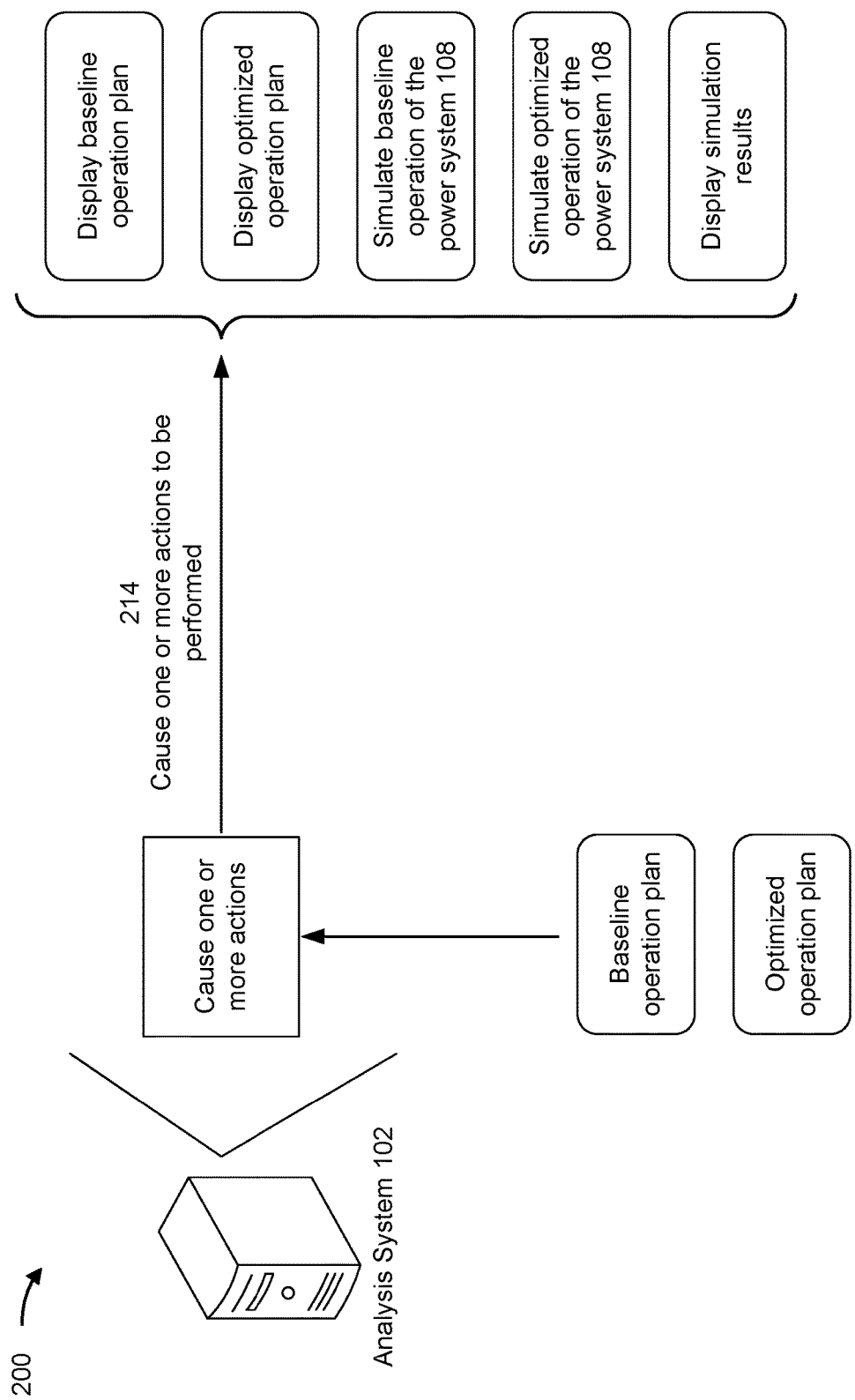

As shown in FIG. 2G, and by reference number 214, the analysis system 102 may cause one or more actions to be performed. The one or more actions may include displaying the baseline operation plan and/or the optimized operation plan. For example, the analysis system 102 may provide the interactive user interface for display (e.g., as described elsewhere herein). The interactive user interface may include the baseline operation plan and/or the optimized operation plan (e.g., the interactive user interface may display the one or more baseline settings of each of the one or more power sources 110 identified by the baseline operation plan and/or the one or more suggested settings of each of the one or more power sources 110 identified by the baseline optimized operation plan).

The one or more actions may include simulating baseline operation of the power system 108 and/or simulating optimized operation of the power system 108. For example, the analysis system 102 may simulate, using the baseline operation plan, operation of the power system to generate one or more baseline performance outputs and/or may simulate, using the optimized operation plan, operation of the power system 108 to generate one or more optimized performance outputs. The one or more baseline performance outputs may respectively correspond to the one or more optimized performance outputs. For example, the baseline performance outputs may include a baseline cost to operate the power system 108, a baseline amount of fuel to operate the power system 108, a baseline amount of power output by the power system 108, a baseline maintenance cost to operate the power system 108, and/or a baseline amount of emissions output by the power system 108. The one or more optimized performance outputs may include an optimized cost to operate the power system 108, an optimized amount of fuel to operate the power system 108, an optimized amount of power output by the power system 108, an optimized maintenance cost to operate the power system 108, and/or an optimized amount of emissions output by the power system 108.

The one or more actions may include displaying simulation results associated with the baseline operation plan and/or the optimized operation plan. For example, the analysis system 102 may provide the interactive user interface for display (e.g., as described elsewhere herein). The interactive user interface may include the one or more baseline performance outputs and/or the one or more optimized performance outputs (e.g., the interactive user interface may display the one or more baseline performance outputs and/or the one or more optimized performance outputs). Additionally, or alternatively, the analysis system 102 may compare the one or more baseline performance outputs and the one or more optimized performance outputs to determine a difference between each corresponding pair of outputs of the one or more baseline performance outputs and the one or more optimized performance outputs (e.g., a percentage difference or a net difference). The interactive user interface, accordingly, may include information related to the comparison of one or more baseline performance outputs and the one or more optimized performance outputs. For example, the interactive user interface may include a difference in cost to operate the power system 108, a difference in an amount of fuel to operate the power system 108, a difference in an amount of power output by the power system 108, a difference in maintenance costs to operate the power system 108, and/or a difference in an amount of emissions output by the power system 108 when operating the power system 108 according to the baseline operation plan as compared to operating the power system 108 according the optimized operation plan.

As indicated above, FIGS. 2A-2G are provided as an example. Other examples may differ from what is described with regard to FIGS. 2A-2G. The number and arrangement of devices shown in FIGS. 2A-2G are provided as an example. In practice, there may be additional devices, fewer devices, different devices, or differently arranged devices than those shown in FIGS. 2A-2G. Furthermore, two or more devices shown in FIGS. 2A-2G may be implemented within a single device, or a single device shown in FIGS. 2A-2G may be implemented as multiple, distributed devices. A set of devices (e.g., one or more devices) shown in FIGS. 2A-2G may perform one or more functions described as being performed by another set of devices shown in FIGS. 2A-2G. For example, the client device 104 may perform one or more functions described as being performed by the analysis system 102.

Figure 3:
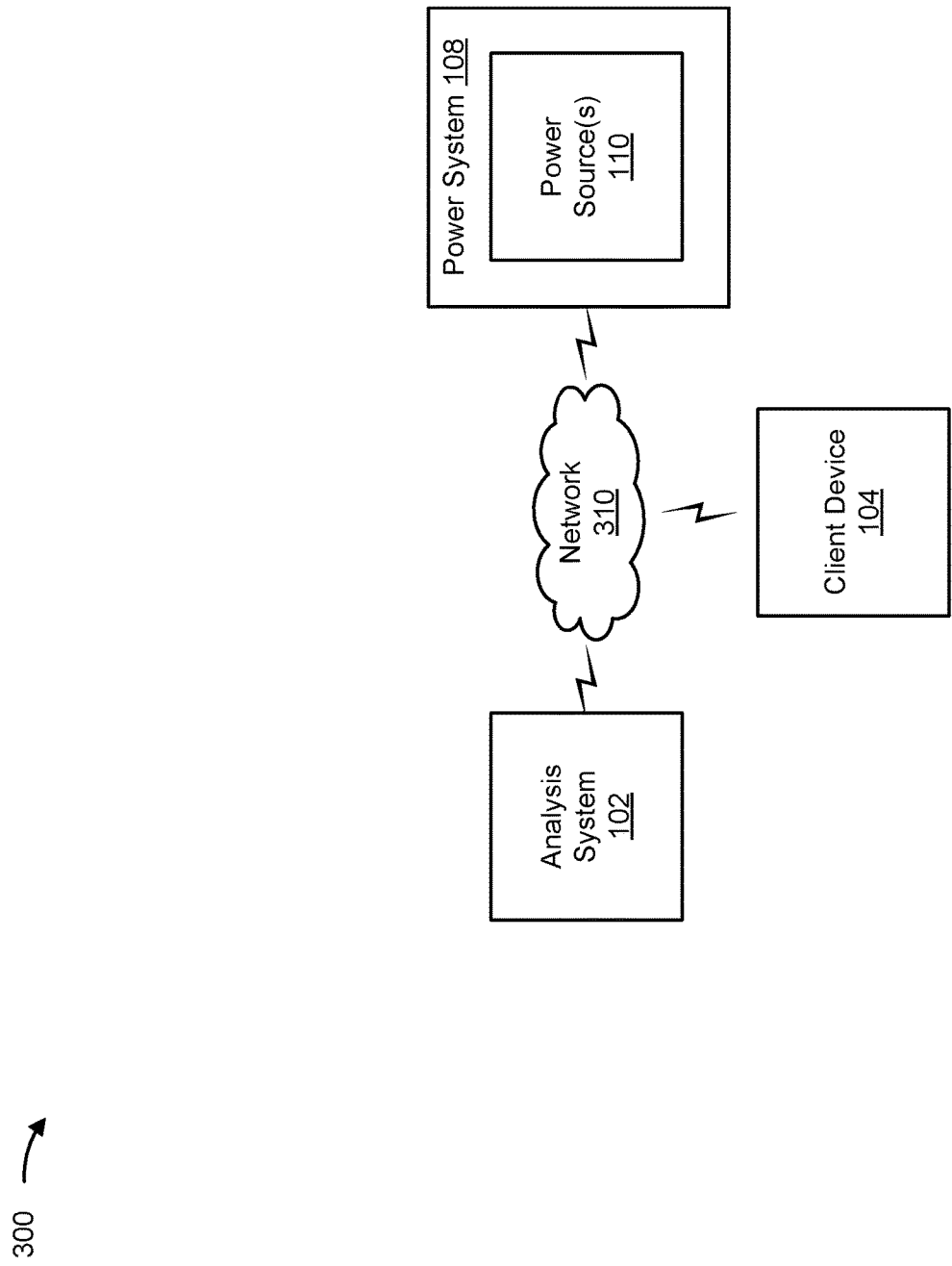
FIG. 3 is a diagram of an example environment in which systems and/or methods described herein may be implemented.

FIG. 3 is a diagram of an example environment 300 in which systems and/or methods described herein may be implemented. As shown in FIG. 3, environment 300 may include the analysis system 102, the client device 104, the power system 108, the one or more power sources 110, and/or a network 310. Devices and/or elements of environment 300 may interconnect via wired connections and/or wireless connections.

The analysis system 102 includes one or more devices capable of receiving, generating, storing, processing, providing, and/or routing information, as described elsewhere herein. The analysis system 102 may include a communication device and/or a computing device. For example, the analysis system 102 may include a server, such as an application server, a client server, a web server, a database server, a host server, a proxy server, a virtual server (e.g., executing on computing hardware), or a server in a cloud computing system. In some implementations, the analysis system 102 includes computing hardware used in a cloud computing environment.

The client device 104 includes one or more devices capable of receiving, generating, storing, processing, and/or providing information, as described elsewhere herein. The client device 104 may include a communication device and/or a computing device. For example, the client device 104 may include a wireless communication device, a mobile phone, a user equipment, a laptop computer, a tablet computer, a desktop computer, or a similar type of device.

Each of the analysis system 102 and the client device 104 may include one or more processors (e.g., one or more of a central processing unit, a graphics processing unit, a microprocessor, a controller, a microcontroller, a digital signal processor, a field-programmable gate array, an application-specific integrated circuit, and/or another type of processing component), one or more memories (e.g., one or more of random access memory (RAM); read only memory (ROM); a hard disk drive; another type of memory, such as a flash memory, a magnetic memory, and/or an optical memory; and/or a non-transitory computer-readable medium), and/or one or more networking components (e.g., one or more communication components).

The power system 108 includes the one or more power sources 110. The power system 108 may be configured to utilize the one or more power sources 110 to generate power (e.g., mechanical power and/or electrical power) for the work site 106. Each of the one or more power sources 110 includes a device for generating power, such as a genset, an internal combustion engine, an energy storage system, or a hydraulic fracturing rig.

The power system 108 and/or at least one power source 110 may each include a data structure that includes one or more devices capable of receiving, generating, storing, processing, and/or providing information, as described elsewhere herein. The data structure may include a communication device and/or a computing device. For example, the data structure may include a database, a server, a database server, an application server, a client server, a web server, a host server, a proxy server, a virtual server (e.g., executing on computing hardware), or a similar type of device. The data source may communicate with one or more other devices of environment 300, as described elsewhere herein.

Network 310 includes one or more wired and/or wireless networks. For example, network 310 may include a cellular network, a public land mobile network (PLMN), a local area network (LAN), a wide area network (WAN), a private network, the Internet, and/or a combination of these or other types of networks. The network 310 enables communication among the devices of environment 300.

The number and arrangement of devices and networks shown in FIG. 3 are provided as an example. In practice, there may be additional devices and/or networks, fewer devices and/or networks, different devices and/or networks, or differently arranged devices and/or networks than those shown in FIG. 3. Furthermore, two or more devices shown in FIG. 3 may be implemented within a single device, or a single device shown in FIG. 3 may be implemented as multiple, distributed devices. A set of devices (e.g., one or more devices) of environment 300 may perform one or more functions described as being performed by another set of devices of environment 300.

Figure 4:
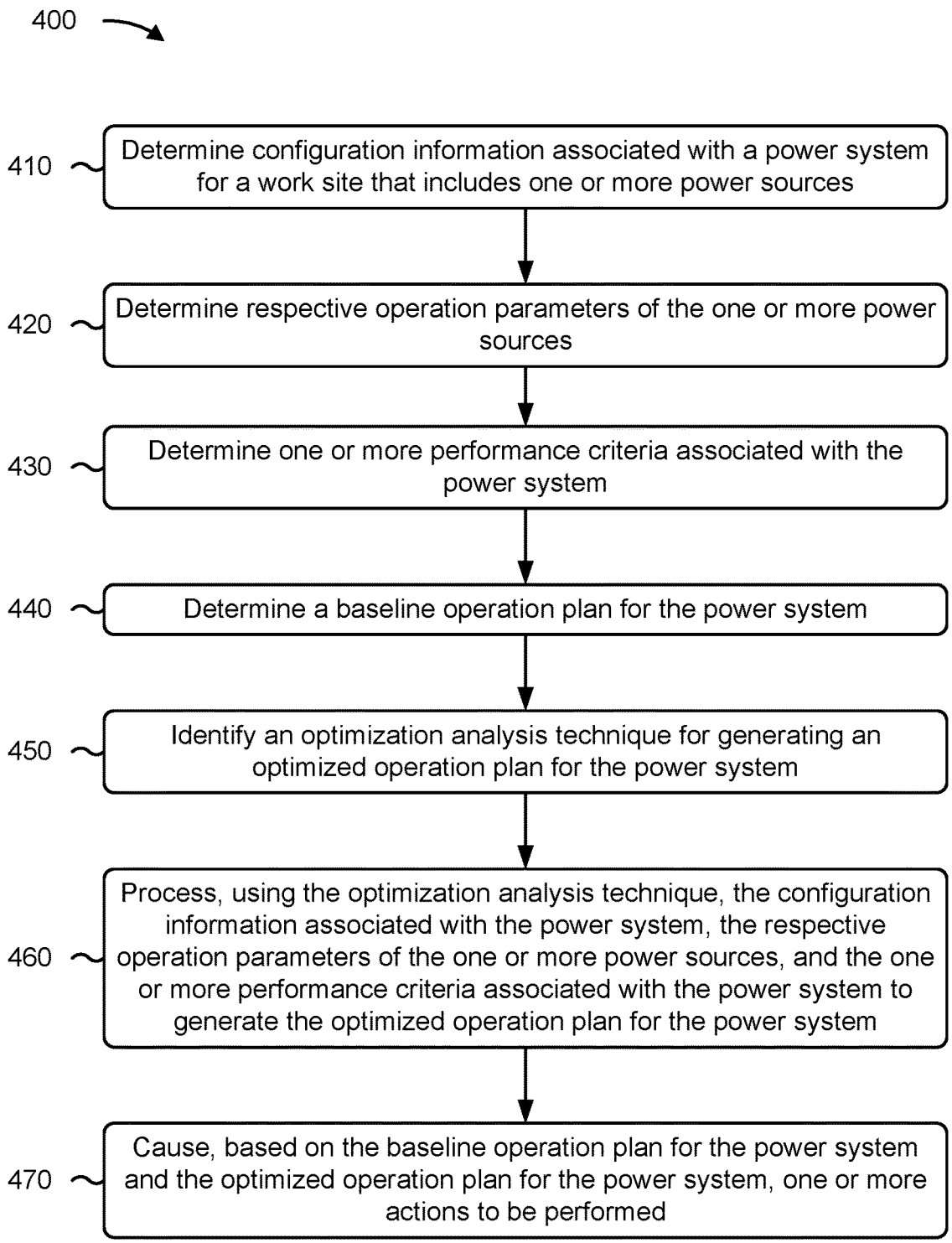
FIG. 4 is a flowchart of an example process relating to generating an optimized operation plan for a power system described herein.

FIG. 4 is a flowchart of an example process 400 associated with generating an optimized operation plan for a power system. One or more process blocks of FIG. 4 may be performed by a system (e.g., analysis system 102) and/or may be performed by another device or a group of devices separate from or including the system, such as a device (e.g., client device 104).

As shown in FIG. 4, process 400 may include determining configuration information associated with a power system for a work site that includes one or more power sources (block 410). For example, the system may determine configuration information associated with a power system for a work site that includes one or more power sources, as described above.

As further shown in FIG. 4, process 400 may include determining respective operation parameters of the one or more power sources (block 420). For example, the system may determine respective operation parameters of the one or more power sources, as described above.

As further shown in FIG. 4, process 400 may include determining one or more performance criteria associated with the power system (block 430). For example, the system may determine one or more performance criteria associated with the power system, as described above.

As further shown in FIG. 4, process 400 may include determining a baseline operation plan for the power system (block 440). For example, the system may determine a baseline operation plan for the power system, as described above.

As further shown in FIG. 4, process 400 may include identifying an optimization analysis technique for generating an optimized operation plan for the power system (block 450). For example, the system may identify an optimization analysis technique for generating an optimized operation plan for the power system, as described above.

As further shown in FIG. 4, process 400 may include processing, using the optimization analysis technique, the configuration information associated with the power system, the respective operation parameters of the one or more power sources, and the one or more performance criteria associated with the power system to generate the optimized operation plan for the power system (block 460). For example, the system may process, using the optimization analysis technique, the configuration information associated with the power system, the respective operation parameters of the one or more power sources, and the one or more performance criteria associated with the power system to generate the optimized operation plan for the power system, as described above.

As further shown in FIG. 4, process 400 may include causing, based on the baseline operation plan for the power system and the optimized operation plan for the power system, one or more actions to be performed (block 470). For example, the system may cause, based on the baseline operation plan for the power system and the optimized operation plan for the power system, one or more actions to be performed, as described above.

Although FIG. 4 shows example blocks of process 400, process 400 may include additional blocks, fewer blocks, different blocks, or differently arranged blocks than those depicted in FIG. 4. Two or more of the blocks of process 400 may be performed in parallel.

INDUSTRIAL APPLICABILITY

The above-described techniques allow an analysis system 102 to generate an optimized operation plan for a power system 108. For example, the analysis system 102 uses an optimization analysis technique to process configuration information associated with the power system 108, respective operation parameters of one or more power sources 110 of the power system 108, and/or one or more performance criteria associated with the power system 108 to generate the optimized operation plan for the power system 108. In this way (e.g., by facilitating configuration of the power system 108 according to the optimized operation plan), the analysis system 102 enables the power system 108 to be configured in an optimized way that minimizes fuel consumption of the power system 108, that minimizes maintenance costs and/or maintenance time of the power system 108, that provides a maximum output power performance of the power system 108, and/or that minimizes emissions by the power system 108, among other examples.

Further the analysis system 102 presents and obtains, via an interactive user interface, information related to the power system 108 and the one or more power sources 110 in an organized and/or comprehensive manner that allows a user (e.g., an operator of the power system 108) to quickly and/or efficiently identify ways to improve a performance of the power system 108 (e.g., by configuring the power system 108 to operate according to the optimized operation plan). Further, the analysis system 102 simulates operation of the power system 108 according to the optimized operation plan to generate one or more optimized performance outputs and presents, via the interactive user interface, information associated with the simulation. This allows the user to quickly and/or efficiently identify the optimizations provided by the optimized operation plan.

The foregoing disclosure provides illustration and description, but is not intended to be exhaustive or to limit the implementations to the precise forms disclosed. Modifications and variations may be made in light of the above disclosure or may be acquired from practice of the implementations. Furthermore, any of the implementations described herein may be combined unless the foregoing disclosure expressly provides a reason that one or more implementations cannot be combined. Even though particular combinations of features are recited in the claims and/or disclosed in the specification, these combinations are not intended to limit the disclosure of various implementations. Although each dependent claim listed below may directly depend on only one claim, the disclosure of various implementations includes each dependent claim in combination with every other claim in the claim set.

As used herein, "a," "an," and a "set" are intended to include one or more items, and may be used interchangeably with "one or more." Further, as used herein, the article "the" is intended to include one or more items referenced in connection with the article "the" and may be used interchangeably with "the one or more." Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A system, comprising:
   one or more memories; and
   one or more processors, coupled to the one or more memories, configured to:
      determine configuration information associated with a power system for a work site that includes one or more power sources;
      determine respective operation parameters of the one or more power sources;
      determine one or more performance criteria associated with the power system;
      identify a first optimization analysis technique and a second optimization analysis technique for generating an optimized operation plan for the power system;
      process, based on a first weight factor for the first optimization analysis technique and a second weight factor for the second optimization analysis technique, the configuration information associated with the power system, the respective operation parameters of the one or more power sources, and the one or more performance criteria associated with the power system to generate the optimized operation plan for the power system,
         wherein the second weight factor is different from the first weight factor,
         wherein the first weight factor and the second weight factor indicate a first percentage of weight the first optimization analysis technique should be given and a second percentage of weight the second optimization analysis technique should be given for generating the optimized operation plan for the power system,
         wherein the first optimization analysis technique comprises at least one of:
            a power system maintenance optimization analysis technique,
            a power system performance optimization analysis technique, or
            a power system emissions optimization analysis technique, and
         wherein the second optimization analysis technique is different from the first optimization analysis technique; and
      cause, based on the optimized operation plan for the power system, one or more actions to be performed.

2. The system of claim 1, wherein the configuration information associated with the power system includes at least one of:
   an identifier associated with the work site;
   a type of the work site;
   an identifier of the power system;
   a type of the power system;
   a number of the one or more power sources included in the power system;
   an identifier of each of the one or more power sources included in the power system;
   a type of each of the one or more power sources included in the power system;
   a priority of each of the one or more power sources included in the power system; or
   a group associated with each of the one or more power sources included in the power system.

3. The system of claim 1, wherein the respective operation parameters of the one or more power sources indicate, for each power source, of the one or more power sources, at least one of:
   an identifier associated with the power source;
   a type of the power source;
   a vendor of the power source;
   a model of the power source;
   one or more capabilities of the power source;
   one or more settings of the power source; or
   an activation status of the power source.

4. The system of claim 1, wherein the one or more processors are further configured to:
provide, to a client device, an interactive user interface for display that includes an input functionality; and
receive, based on providing the interactive user interface for display, input information,
wherein at least one of the configuration information associated with the power system, the respective operation parameters of the one or more power sources, or the one or more performance criteria associated with the power system is determined based on the input information.

5. The system of claim 1, wherein the second optimization analysis technique comprises at least a power system fuel economy optimization analysis technique.

6. The system of claim 1, wherein the one or more processors, to identify the first optimization analysis technique and the second optimization analysis technique, are configured to:
provide an interactive user interface for display that includes a list of a plurality of optimization analysis techniques; and
receive, based on providing the interactive user interface for display, a selection of the first optimization analysis technique and the second optimization analysis technique from the plurality of optimization analysis techniques.

7. The system of claim 1, wherein the optimized operation plan for the power system identifies for a particular power source, of the one or more power sources, at least one of:
one or more suggested settings of the particular power source; or
a suggested activation status of the particular power source.

8. The system of claim 1, wherein the optimized operation plan for the power system identifies an additional power source to include in the power system and at least one of:
a type of the additional power source;
a vendor of the additional power source;
a model of the additional power source;
one or more capabilities of the additional power source; or
one or more settings of the additional power source.

9. The system of claim 1, wherein the one or more processors, to cause the one or more actions to be performed, are configured to:
provide, to a client device, an interactive user interface for display that includes the optimized operation plan for the power system.

10. The system of claim 1, wherein the one or more processors, to cause the one or more actions to be performed, are configured to:
simulate, using the optimized operation plan for the power system, an operation of the power system;
generate, based on simulating the operation of the power system, one or more optimized performance outputs; and
provide, to a client device, an interactive user interface for display that includes the one or more optimized performance outputs.

11. A method, comprising:
determining, by a system, configuration information associated with a power system for a work site that includes one or more power sources;
determining, by the system, respective operation parameters of the one or more power sources;
determining, by the system, one or more performance criteria associated with the power system;
determining, by the system, a baseline operation plan for the power system;
identifying, by the system, a first optimization analysis technique and a second optimization analysis technique for generating an optimized operation plan for the power system;
processing, by the system and based on a first weight factor for the first optimization analysis technique and a second weight factor for the second optimization analysis technique, the configuration information associated with the power system, the respective operation parameters of the one or more power sources, and the one or more performance criteria associated with the power system to generate the optimized operation plan for the power system,
wherein the second weight factor is different from the first weight factor,
wherein the first weight factor and the second weight factor indicate a first percentage of weight the first optimization analysis technique should be given and a second percentage of weight the second optimization analysis technique should be given for generating the optimized operation plan for the power system,
wherein the first optimization analysis technique comprises at least one of:
a power system maintenance optimization analysis technique,
a power system performance optimization analysis technique, or
a power system emissions optimization analysis technique, and
wherein the second optimization analysis technique is different from the first optimization analysis technique; and
causing, by the system and based on the baseline operation plan for the power system and the optimized operation plan for the power system, one or more actions to be performed.

12. The method of claim 11, further comprising:
communicating with a data structure to obtain operation information related to at least one of the power system or the one or more power sources,
wherein at least one of the configuration information associated with the power system, the respective operation parameters of the one or more power sources, the one or more performance criteria associated with the power system, or the baseline operation plan for the power system is determined based on the operation information.

13. The method of claim 11, wherein the first optimization analysis technique utilizes an optimization map that was generated using at least one particle swarm optimization algorithm.

14. The method of claim 11, wherein the optimized operation plan for the power system identifies at least one additional power source to include in the power system.

15. The method of claim 11, wherein causing the one or more actions to be performed comprises:
providing, to a client device, an interactive user interface for display that includes the optimized operation plan for the power system and the baseline operation plan for the power system.

16. The method of claim 11, wherein causing the one or more actions to be performed comprises:

using the optimized operation plan for the power system to generate one or more optimized performance outputs;

using the baseline operation plan for the power system to generate one or more baseline performance outputs, wherein the one or more optimized performance outputs respectively correspond to the one or more baseline performance outputs; and providing, to a client device, an interactive user interface for display that includes information related to a comparison of the one or more optimized performance outputs and the one or more baseline performance outputs.

17. A non-transitory computer-readable medium storing a set of instructions, the set of instructions comprising:

one or more instructions that, when executed by one or more processors of a device, cause the device to:

determine configuration information associated with a power system for a work site that includes one or more power sources;

determine respective operation parameters of the one or more power sources;

determine one or more performance criteria associated with the power system;

identify a first optimization analysis technique and a second optimization analysis technique for generating an optimized operation plan for the power system;

process, based on a first weight factor for the first optimization analysis technique and a second weight factor for the second optimization analysis technique, the configuration information associated with the power system, the respective operation parameters of the one or more power sources, and the one or more performance criteria associated with the power system to generate the optimized operation plan for the power system, wherein the second weight factor is different from the first weight factor, wherein the first weight factor and the second weight factor indicate a first percentage of weight the first optimization analysis technique should be given and a second percentage of weight the second optimization analysis technique should be given for generating the optimized operation plan for the power system, wherein the first optimization analysis technique comprises at least one of a power system maintenance optimization analysis technique, a power system performance optimization analysis technique, or a power system emissions optimization analysis technique, and wherein the second optimization analysis technique is different from the first optimization analysis technique; and cause, based on the optimized operation plan for the power system, one or more actions to be performed.

18. The non-transitory computer-readable medium of claim 17, wherein the one or more instructions further cause the device to:

provide an interactive user interface for display that includes an input functionality; and receive, based on providing the interactive user interface for display, input information, wherein at least one of the configuration information associated with the power system, the respective operation parameters of the one or more power sources, or the one or more performance criteria associated with the power system is determined based on the input information.

19. The non-transitory computer-readable medium of claim 17, wherein the one or more instructions further cause the device to:

communicate with a data structure to obtain operation information related to at least one of the power system or the one or more power sources, wherein at least one of the configuration information associated with the power system, the respective operation parameters of the one or more power sources, or the one or more performance criteria associated with the power system is determined based on the operation information.

20. The non-transitory computer-readable medium of claim 17, wherein the one or more instructions, that cause the device to cause the one or more actions to be performed, cause the device to:

simulate, using the optimized operation plan for the power system, an operation of the power system;

generate, based on simulating the operation of the power system, one or more optimized performance outputs; and provide, to a client device, an interactive user interface for display that includes the optimized operation plan for the power system and the one or more optimized performance outputs.

* * * * *